(12) United States Patent
Yavid et al.

(10) Patent No.: US 7,304,795 B2
(45) Date of Patent: Dec. 4, 2007

(54) IMAGE PROJECTION WITH REDUCED SPECKLE NOISE

(75) Inventors: Dmitriy Yavid, Stony Brook, NY (US); Miklos Stern, Woodmere, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 14 days.

(21) Appl. No.: 11/116,645

(22) Filed: Apr. 28, 2005

(65) Prior Publication Data

US 2006/0245054 A1 Nov. 2, 2006

(51) Int. Cl.
*G03B 21/56* (2006.01)
*G03B 21/60* (2006.01)

(52) U.S. Cl. ............... 359/443; 359/449; 359/452; 353/79

(58) Field of Classification Search .......... 359/443, 359/449, 452–453; 353/79
See application file for complete search history.

(56) References Cited

U.S. PATENT DOCUMENTS

| | | | |
|---|---|---|---|
| 7,035,006 B2 * | 4/2006 | Umeya et al. | 359/443 |
| 7,035,008 B2 * | 4/2006 | Toda et al. | 359/452 |
| 7,076,138 B2 * | 7/2006 | Rupasov et al. | 385/122 |
| 2003/0214691 A1 * | 11/2003 | Magno et al. | 359/196 |
| 2004/0233524 A1 * | 11/2004 | Lippey et al. | 359/443 |
| 2005/0094265 A1 * | 5/2005 | Wang | 359/443 |
| 2006/0244779 A1 * | 11/2006 | Kommera et al. | 347/27 |

* cited by examiner

*Primary Examiner*—Christopher Mahoney
(74) *Attorney, Agent, or Firm*—Kirschstein, et al.

(57) ABSTRACT

An image projection module within a housing is operative for causing selected pixels in a raster pattern to be illuminated to produce an image on a display screen of VGA quality. The screen is modified and/or the bandwidth of a laser is increased, to reduce speckle noise in the image.

20 Claims, 7 Drawing Sheets

IMAGE PROJECTION WITH REDUCED SPECKLE NOISE

BACKGROUND OF THE INVENTION

1. Field of the Invention

The present invention generally relates to projecting two-dimensional images with reduced speckle noise on display screens.

2. Description of the Related Art

It is generally known to project a two-dimensional image on a display screen based on a pair of scan mirrors which oscillate in mutually orthogonal directions to scan a laser beam over a raster pattern. However, the known image projection systems project an image of limited resolution, typically less than a fourth of video-graphics-array (VGA) quality of 640×480 pixels, and with speckle noise. As such, the known projection systems and display screens have limited versatility.

Speckle noise is an inherent problem in laser-based projection systems and causes considerable degradation in image quality. A monochromatic (red, blue or green) laser emits a laser beam having coherent waves of the same frequency and also having spatial coherence, that is, the waves have a fixed phase relationship with one another both in space and in time. When the beam is incident on a diffuse screen, the waves are scattered by being reflected from the screen and/or transmitted through the screen. The scattered waves have random phase delays and propagate along different directions, but all have the same frequency. When such scattered waves meet, for example, at the retina of the human eye, they produce a static distribution of constructive and destructive interference, i.e., an interference pattern, also known as speckle noise. The human eye whose integration time is on the order of tens of milliseconds sees the speckle noise as a degraded image. If the laser beam does not have entirely coherent waves, then their phase delays can change substantially during the time that the scattered waves take to negotiate the screen and, as a result, the speckle noise pattern changes as well during the integration time of the human eye, thereby reducing speckle contrast.

Each coherent wave of the laser beam is coherent with itself, a property known as temporal coherence. If a wave is combined with a delayed copy of itself, as in a Michelson interferometer, the duration of the delay over which is produces interference is known as the coherence time of the wave. A corresponding property known as coherence length is calculated by multiplying the coherence time by the speed of light. The coherence time of the laser is inversely proportional to its bandwidth. A truly monochromatic wave has an infinite coherence time and an infinite coherence length. However, in practice, no wave is truly monochromatic since this requires a wave of infinite duration. By way of example, a stabilized helium-neon laser can produce a laser beam with a coherence length in excess of five meters, and the coherence time is on the order of several nanoseconds. Hence, the coherence time of lasers is generally in the nanosecond range, while the laser beam takes only a few picoseconds to reflect from and/or pass through the display screen.

SUMMARY OF THE INVENTION

Objects of the Invention

Accordingly, it is a general object of this invention to provide an image projection system that projects a speckle noise-reduced, sharp and clear, two-dimensional image on a display screen.

Another object of this invention is to reduce speckle noise on projected images.

Still another object of this invention is to modify a display screen itself to reduce speckle noise of images projected thereon.

FEATURES OF THE INVENTION

In keeping with these objects and others which will become apparent hereinafter, one feature of this invention resides, briefly stated, in an arrangement for, and a method of, projecting a two-dimensional image with reduced speckle noise, the arrangement including a display screen, a laser for emitting a laser beam having coherent waves of the same frequency, and a coherence time, an image projection assembly or module for directing the beam to be incident on the screen, and for sweeping the beam as a pattern of scan lines across the screen, each scan line having a number of pixels, and for causing selected pixels to be illuminated, and rendered visible, to produce the image on the screen; and means for modifying the screen, for trapping the beam incident on the screen for a time not less than the coherence time, and for generating a time-varying interference pattern in which the speckle noise is reduced.

In accordance with one feature of this invention, the modifying means includes a plurality of optical resonators which trap the beam for a time comparable to, or exceeding, the coherence time. Thus, the trapped beam does not reflect from and/or pass through the screen in picoseconds, but is held for a longer time on the order of nanoseconds. The scattered waves produce a time-varying interference pattern which is faster than the integration time of the human eye. The eye does not see the individual speckles, but instead, perceives an average, more uniform illumination.

The display screen itself is adapted to support the optical resonators. In the preferred embodiment, the optical resonators are small particles of photonic crystals embedded in the screen. Each particle is smaller in size than a pixel. Each crystal is preferably a periodic dielectric structure, for example, silicon, that has a band gap that prevents propagation of a predetermined frequency range of light. Because the light is trapped, a resonant cavity is created.

The display screen is preferably constituted of a moldable material, such as plastic or rubber, and the photonic crystals are mixed in with the moldable material in a liquid state. Once the moldable material is set, the crystals are randomly distributed throughout the screen. Each resonant cavity formed by the crystals has a very high Q factor (above 10,000). The time constant, with which these cavities trap the light, is roughly equal to the round-trip time of the light inside the crystal multiplied by the Q factor and equals or exceeds the coherence time of the laser.

Another feature of this invention is to add an additive to the screen, again to trap the incident beam for a time preferably exceeding the coherence time. The material of the screen itself may be selected to have this trapping characteristic. The screen may include a flowable material, such as a fluid or a gas, whose atoms or molecules are moved at a rate sufficient to trap and delay the incident light.

In still another approach, the screen is not modified, but instead, the bandwidth of the laser is increased. This serves to decrease the coherence time, and again the light is delayed.

The novel features which are considered as characteristic of the invention are set forth in particular in the appended claims. The invention itself, however, both as to its construction and its method of operation, together with additional objects and advantages thereof, will be best under-

DETAILED DESCRIPTION OF THE PREFERRED EMBODIMENTS

Figures 1, 2:
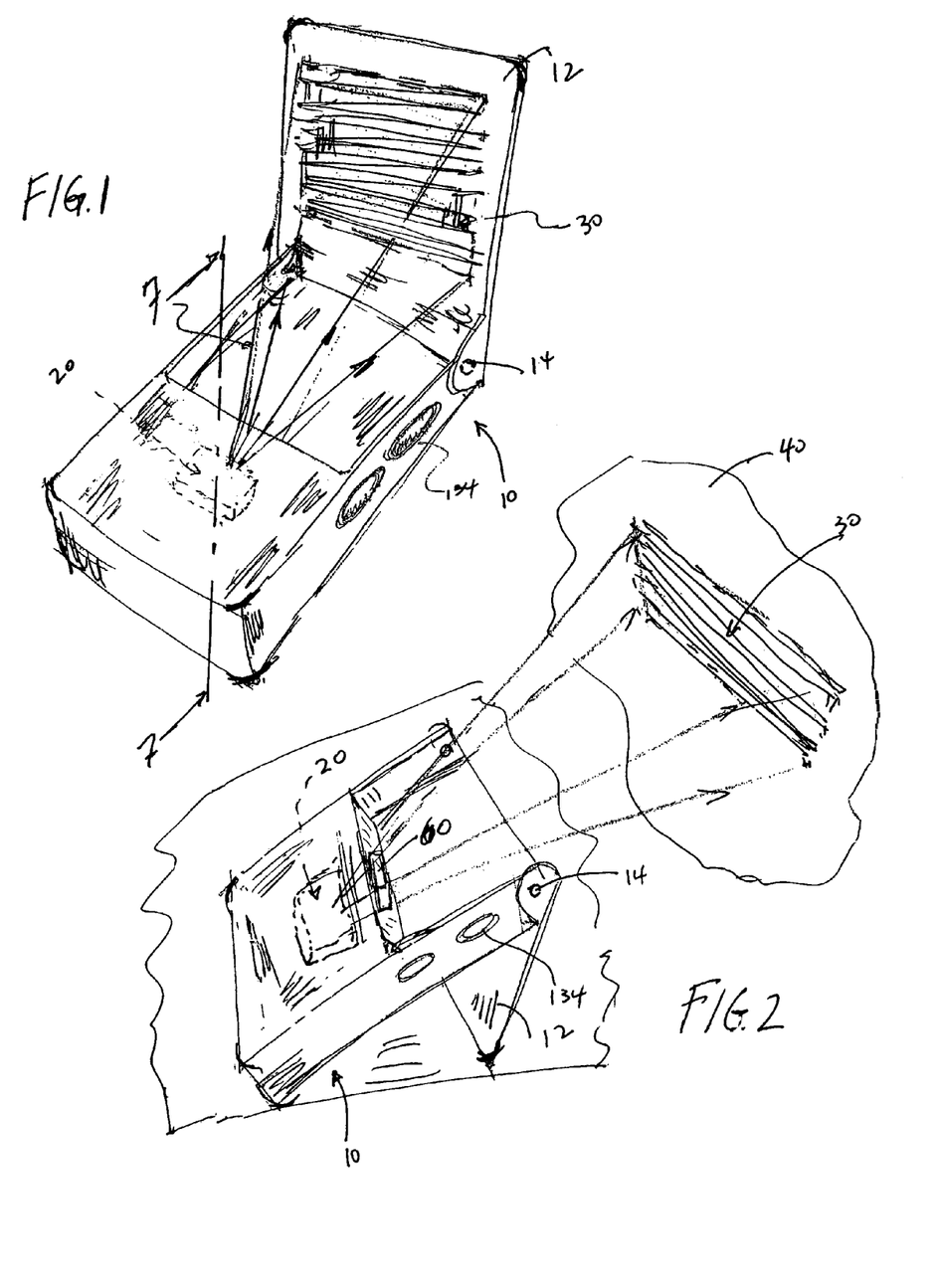
FIG. 1 is a perspective view of an arrangement for projecting an image on a display screen in accordance with this invention.
FIG. 2 is a perspective view of the arrangement of FIG. 1 for projecting an image at another display screen in accordance with this invention.

Reference numeral 10 in FIG. 1 generally identifies a housing in which a lightweight, compact, image projection module 20, as shown in FIG. 2, is mounted. The module 20 is operative for projecting a two-dimensional image at a distance from the module at different display screens. As described below, the image is comprised of illuminated and non-illuminated pixels on a raster pattern 30 of scan lines swept by a scanner in module 20.

The parallelepiped shape of the housing 10 represents just one form factor in which the module 20 may be incorporated. In the preferred embodiment, the module 20 measures about 30 mm×15 mm×10 mm or about 4.5 cubic centimeters. This compact, miniature size allows the module 20 to be mounted in housings of many diverse shapes, large or small, portable or stationary, some of which are described below.

Figure 3:
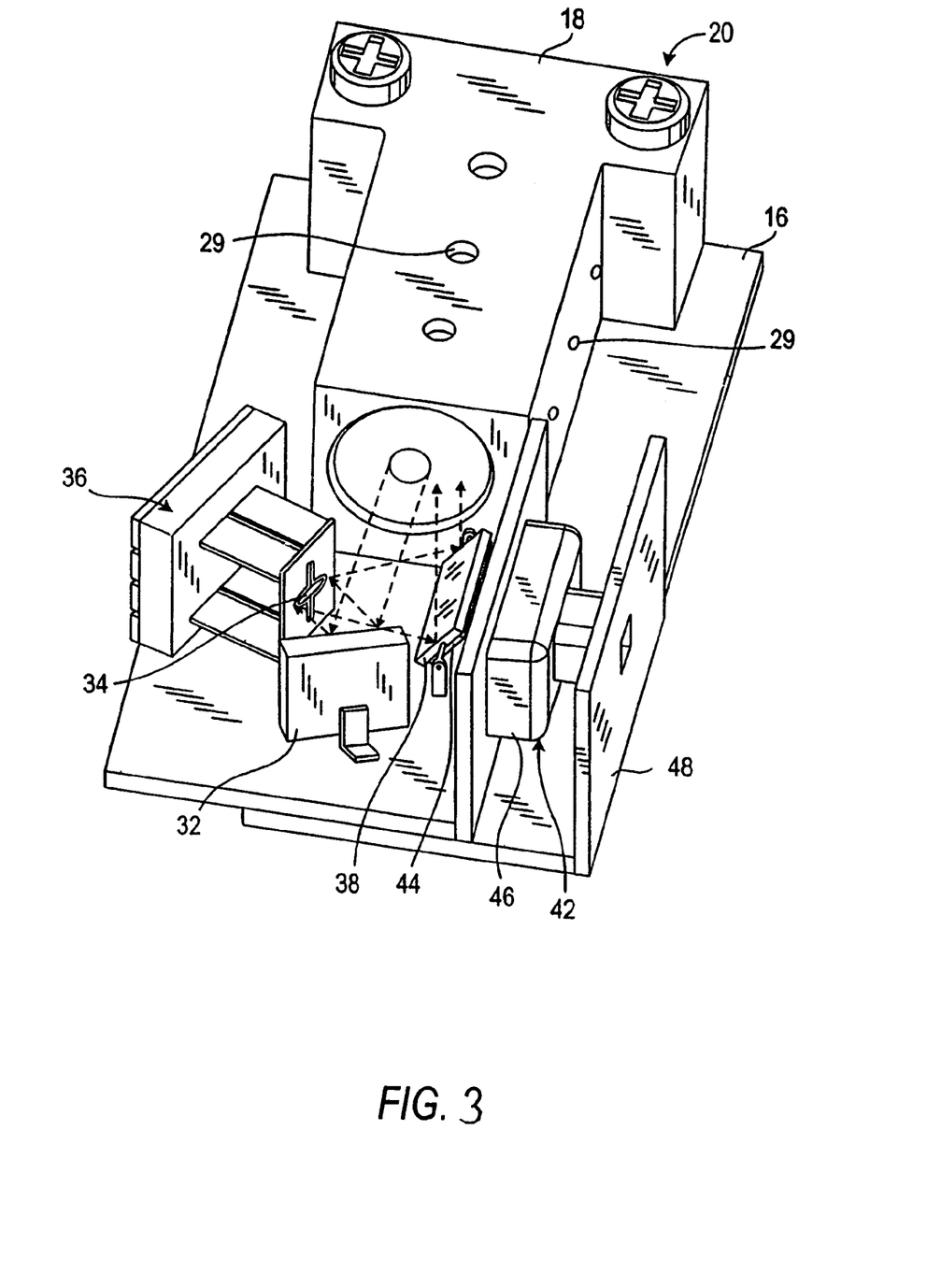
FIG. 3 is an enlarged, overhead, perspective view of an image projection assembly or module for installation in the arrangement of FIG. 1.

Referring to FIG. 3, the module 20 includes a support 16, for example, a printed circuit board, and a laser/optics casing 18 in which are mounted a laser 25 (see FIG. 6) and a lens assembly, including one or more lenses and preferably a pair of lenses 22, 24 operative for optically modifying a laser beam emitted by the laser 25.

Figure 6:
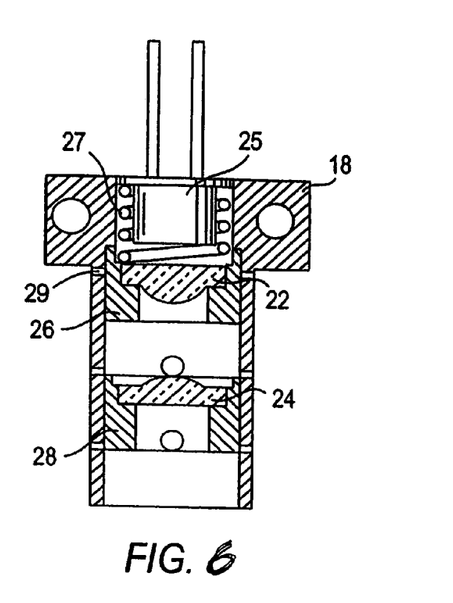
FIG. 6 is an enlarged sectional view of the laser/optics assembly of the module as taken on line 6-6 of FIG. 4.

As best seen in FIG. 6, the laser 25 is a solid-state laser, preferably, a semiconductor laser, which, when energized, emits a laser beam having an oval cross-section. Lens 22 is a biaspheric convex lens having a positive focal length of about 2 mm and is operative for collecting virtually all the energy in the beam and for producing a diffraction-limited beam. Lens 24 is a concave lens having a negative focal length of about −20 mm. Lenses, 22, 24 are held by respective lens holders 26, 28 about 4 mm apart inside the casing 18 and are fixed in place by allowing an adhesive (not illustrated for clarity) introduced during assembly into the fill holes 29 to set. A coil spring 27 assists in positioning the laser. The lenses 22, 24 shape the beam profile.

The laser beam exiting the casing 18 is directed to, and reflected off, an optional stationary bounce mirror 32. A scanner is also mounted on the board 16 and includes a first scan mirror 34 oscillatable by an inertial drive 36 at a first scan rate to sweep the laser beam reflected off the bounce mirror over the first horizontal scan angle A (see FIG. 7), and a second scan mirror 38 oscillatable by an electromagnetic drive 42 at a second scan rate to sweep the laser beam reflected off the first scan mirror 34 over the second vertical scan angle B (see FIG. 7). In a variant construction, the scan mirrors 34, 38 can be replaced by a single two-axis mirror.

The inertial drive 36 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the module to less than one watt.

The electromagnetic drive 42 includes a permanent magnet 44 jointly mounted on and behind the second scan mirror 38, and an electromagnetic coil 46 operative for generating a periodic magnetic field in response to receiving a periodic drive signal. The coil 46 is adjacent the magnet 44 so that the periodic field magnetically interacts with the permanent field of the magnet 44 and causes the magnet and, in turn, the second scan mirror 38 to oscillate. The coil 46 is supported by an upright wall 48 connected to the board 16.

The inertial drive 36 oscillates the scan mirror 34 at a high speed at a scan rate preferably greater than 5 kHz and, more particularly, on the order of 18 kHz or more. This high scan rate is at an inaudible frequency, thereby minimizing noise and vibration. The electromagnetic drive 42 oscillates the scan mirror 38 at a slower scan rate on the order of 40 Hz which is fast enough to allow the image to persist on a human eye retina without excessive flicker.

The faster mirror 34 sweeps a horizontal scan line, and the slower mirror 38 sweeps the horizontal scan line vertically, thereby creating a raster pattern which is a grid or sequence of roughly parallel scan lines from which the image is constructed. Each scan line has a number of pixels. The image resolution is preferably VGA quality of 640×480 pixels. In some applications, a one-half VGA quality of 320×480 pixels, or one-fourth VGA quality of 320×240 pixels, is sufficient. At minimum, a resolution of 160×160 pixels is desired.

The roles of the mirrors 34, 38 could be reversed so that mirror 38 is the faster, and mirror 34 is the slower. Mirror 34 can also be designed to sweep the vertical scan line, in which event, mirror 38 would sweep the horizontal scan line. Also, the inertial drive can be used to drive the mirror 38. Indeed, either mirror can be driven by an electromechanical, electrical, mechanical, electrostatic, magnetic, or electromagnetic drive.

The image is constructed by selective illumination of the pixels in one or more of the scan lines. As described below in greater detail with reference to FIG. 8, a controller causes selected pixels in the raster pattern 30 to be illuminated, and rendered visible, by the laser beam. For example, a power controller 50 conducts an electrical current to the laser 25 to energize the latter to emit light at each selected pixel, and does not conduct an electrical current to the laser 25 to deenergize the latter to non-illuminate the other non-selected pixels. The resulting pattern of illuminated and non-illuminated pixels comprise the image, which can be any display of human- or machine-readable information or graphic. Instead of a power controller, an acousto-optical modulator could be used to deflect the laser beam away from any desired pixel to non-illuminate the pixel by not allowing the laser beam to reach the first scan mirror.

Figure 7:
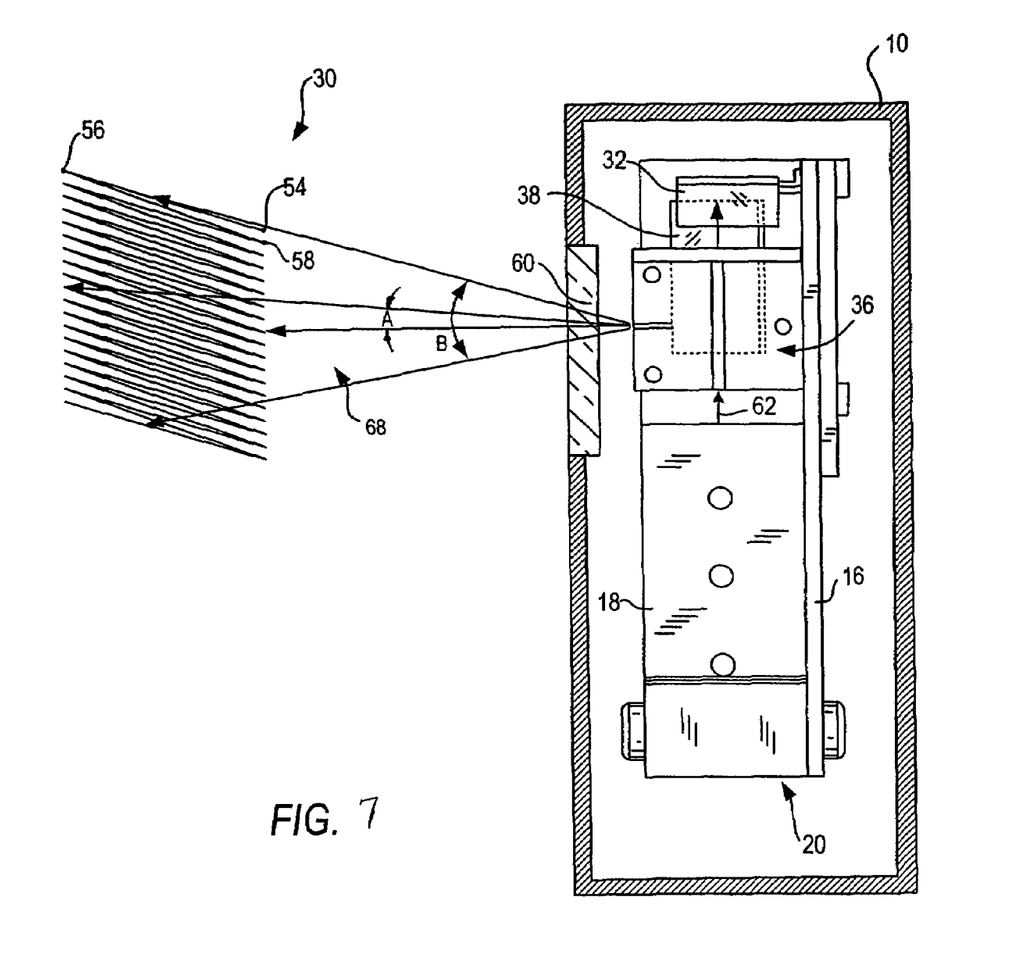
FIG. 7 is an enlarged sectional view taken on line 7-7 of FIG. 1.

Referring to FIG. 7, the raster pattern 30 is shown in an enlarged view. Starting at point 54, the laser beam is swept by the inertial drive along the horizontal direction at the horizontal scan rate to the point 56 to form a scan line. Thereupon, the laser beam is swept by the electromagnetic drive along the vertical direction at the vertical scan rate to the point 58 to form a second scan line. The formation of successive scan lines proceeds in the same manner.

The image is created in the raster pattern 30 by energizing or pulsing the laser on and off at selected times under control of a microprocessor or control circuit by operation of the power controller 50, or by maintaining the laser on and deflecting the laser beam at selected times by operation of an acousto-optical modulator. The laser produces visible light and is turned on, or its beam is properly deflected, only when a pixel in the desired image is desired to be seen. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 4:
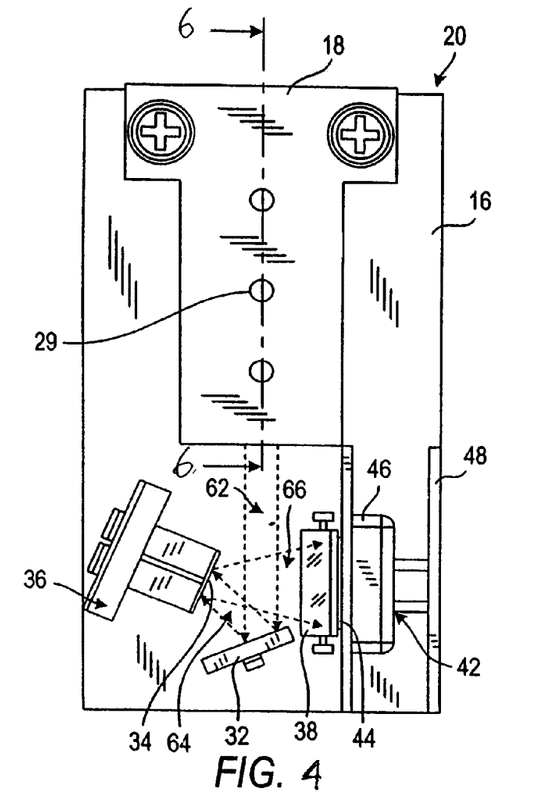
FIG. 4 is a top plan view of the module of FIG. 3.
Figure 5:
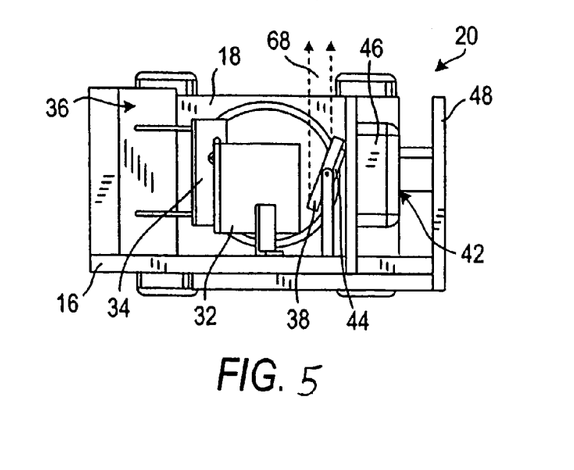
FIG. 5 is an end elevational view of the module of FIG. 2.

FIG. 7 also shows a light-transmissive port or window 60 on the housing 10 and through which the image is projected in a direction generally perpendicular to the printed circuit board 16. Again, with reference to FIG. 4, the optical path of the laser beam has a vertical leg 62 between the laser/optics casing 18 and the bounce mirror 32, an inclined leg 64 toward the left to the scan mirror 34, a horizontal leg 66 toward the right to the scan mirror 38, and a forward leg 68 (see FIG. 7) in a direction toward the window 60 and perpendicular to the board 16. The image can be projected on any translucent or reflective surface, such as screen 12, which is adapted, as explained below, in accordance with this invention.

Figure 8:
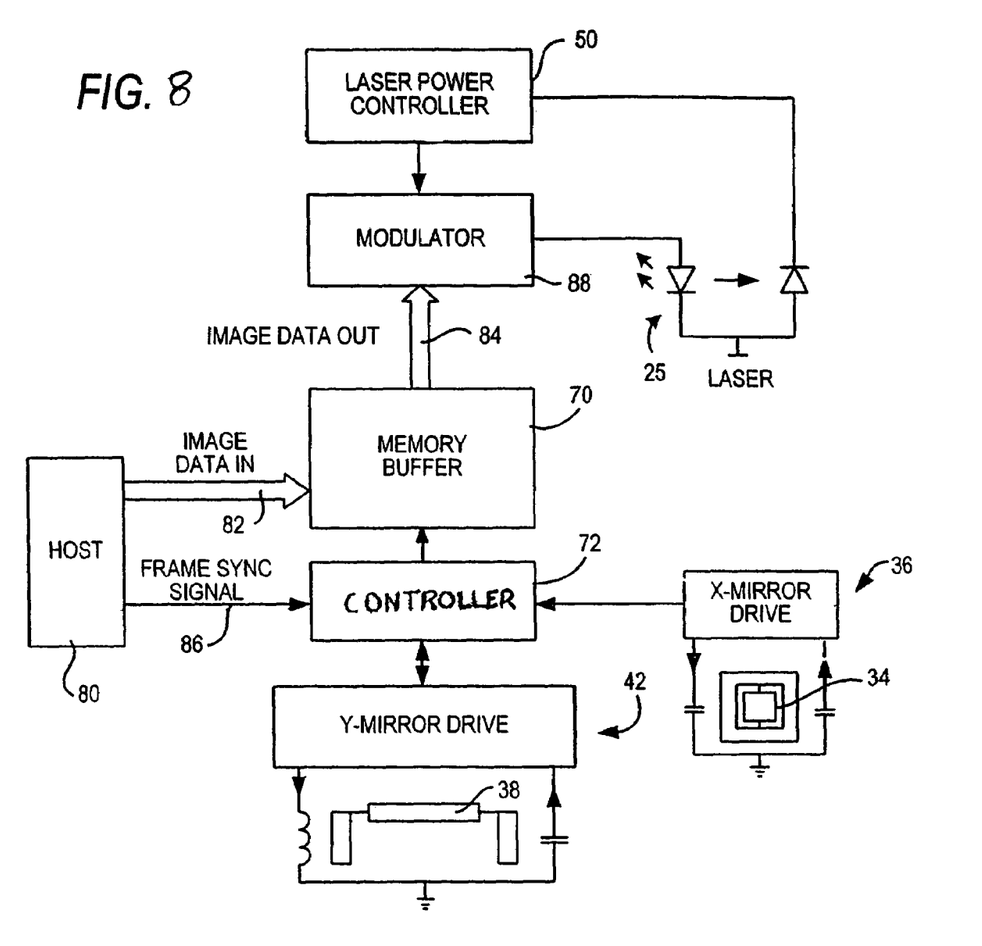
FIG. 8 is an electrical schematic block diagram depicting operation of the module of FIG. 3.

As shown in FIG. 8, a host 80 sends the bit-mapped image data 82 to a memory buffer 70 which is controlled by a memory controller 72. The storage of one full VGA frame would require about 300 kilobytes, and it would be desirable to have enough memory in the buffer 70 for two full frames (600 kilobytes) to enable one frame to be written by the host, while another frame is being read and projected. On the other hand, if the size of the buffer is smaller than a full frame, then the controller 72 can begin displaying lines after the memory has reached its maximum storage capacity with data sent by the host, or there can be simultaneous reading from and writing to the buffer. A frame synchronization signal 86 is sent by the host to the controller 72.

The first scan mirror 34, also known as the high speed or X-axis mirror, is driven by the inertial drive 36 and is controlled by the memory controller 72. Similarly, the second scan mirror 38, also known as the slow speed or Y-axis mirror, is driven by the electromagnetic drive 42 and is controlled by the memory controller 72. Since the image is projected during both forward and backward scans of the X-axis mirror, every other line of image data is displayed in reverse order. Hence, either the host has to write the image data to the buffer in the reverse order, or the memory controller has to read the image data in the reverse order.

The X-axis mirror has a sinusoidal velocity profile. In a given time interval, the laser beam sweeps more pixels in the middle of each scan line than at the ends of each scan line. To avoid image distortion, either the memory controller 72 should clock the pixels at a variable clock rate, or the host should fill the buffer 70 with data in which the size of the pixels is varied. A variable clock rate is the preferred technique since it allows pixels of a fixed size to be shared with other displays.

The output of the buffer is a digital signal 84 which is frame-synchronized with the host, and clock-and line-synchronized with the X-axis mirror 34. This digital signal is sent to a modulator 88 which, in turn, controls the laser 25.

Figure 9:
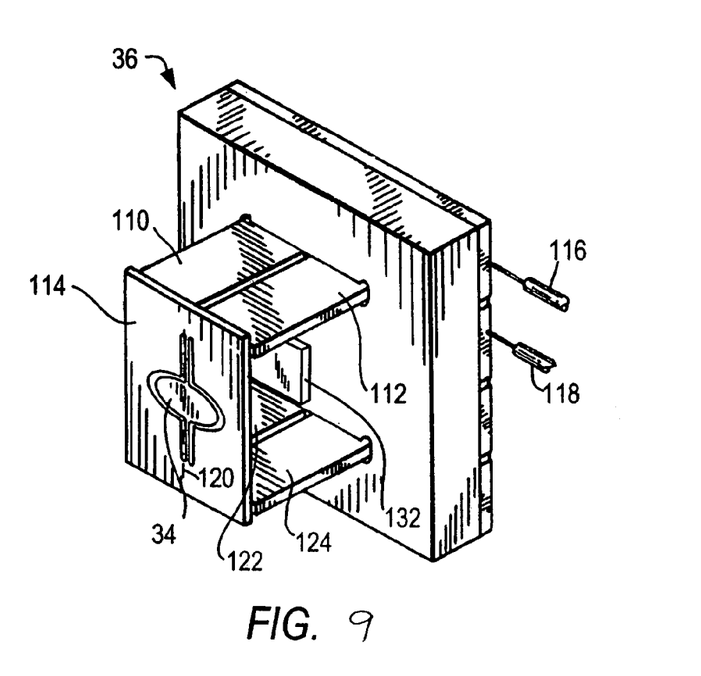
FIG. 9 is a front perspective view of a drive for the module of FIG. 2.
Figure 10:
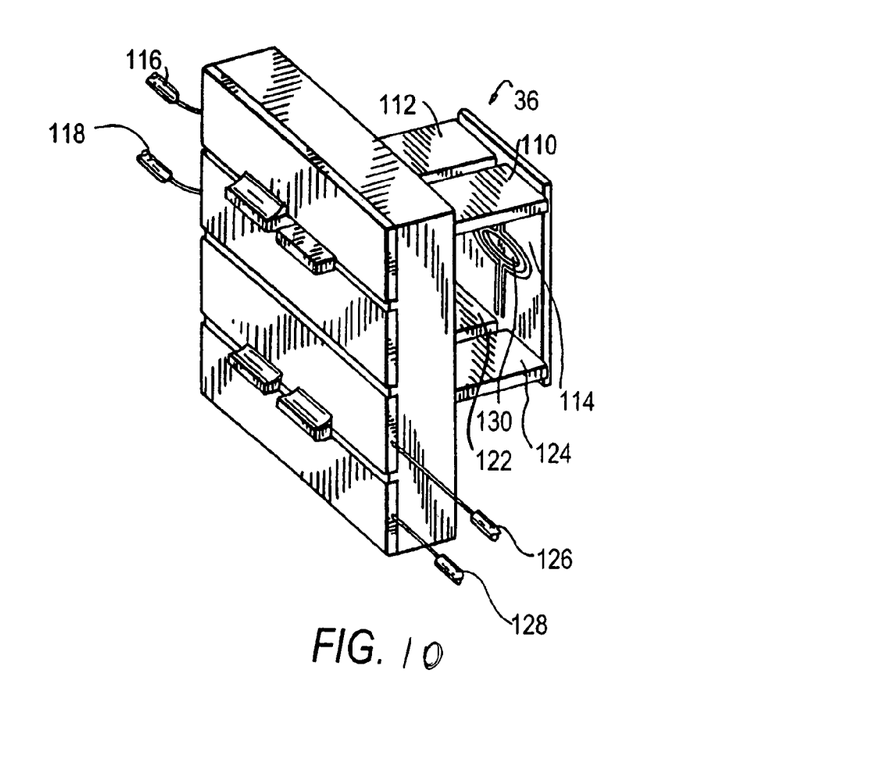
FIG. 10 is a rear perspective view of the drive of FIG. 9.

FIGS. 9-10 depict the inertial drive 36 in isolation. As described in the aforementioned U.S. patent application Ser. No. 10/387,878, filed Mar. 13, 2003, an upper pair of piezoelectric transducers 110, 112 contacts spaced-apart portions of a frame 114 above the scan mirror 34 and is electrically connected by wires 116, 118 to a periodic alternating voltage source. In use, the periodic source causes the transducers 110, 112 to alternatingly extend and contract in length, thereby causing the frame 114 to twist about a hinge axis 120. The scan mirror 34 is connected to the frame at opposite ends of the hinge axis and oscillates about the hinge axis at a resonant frequency.

A lower pair of piezoelectric transducers 122, 124 contacts spaced-apart locations of the frame 114 below the scan mirror 34. The transducers 122, 124 serve as feedback or pick-up mechanisms to monitor the oscillating movement of the frame and to generate and conduct electrical feedback signals along wires 126, 128 to a feedback control circuit.

However, vibrations induced by the transducers 110, 112 are detected by the transducers 122, 124 and tend to corrupt the feedback signals, thereby adversely affecting the projected image. Hence, the drive and pick-up mechanisms are preferably made different, for example, by not basing both mechanisms on the piezoelectric effect. One of the mechanisms is based on a different type of mechanism. For example, as shown in FIG. 10, a magnet 130 is jointly mounted behind the mirror 34 for joint oscillation therewith, and an electromagnetic feedback coil 132, as shown in FIG. 9, is mounted adjacent the magnet 130. The coil 132 senses the periodic electromagnetic field induced by the moving magnet and is immune from vibrations from the transducers 110, 112.

Returning to FIGS. 1-2, the screen 12 is pivotally mounted on the housing 10 at pivots 14 to any one of a plurality of positions. For example, as shown in FIG. 1, the screen 12 lies in a vertical plane, and the bit-mapped image of the raster pattern 30 is projected through the window 60 by the module 20 onto the vertical screen, which defines an image plane. The screen 12 can be tilted back to form an obtuse angle with the horizontal for more convenient viewing from the front of the housing, thereby defining another image plane. Other angles, including acute angles, could also be employed. As shown in FIG. 2, the screen 12 can be pivoted to an angular position in which the screen supports the housing 10 in a tilted position, in which case, the image is not projected on the screen 12, but instead, is projected on a remote display surface, such as a remote display screen 40, which defines still another image plane. An actuator 134 is manually depressed to initiate the image projection. Thus, in the embodiment of FIGS. 1-2, the image can be projected on-board the housing 10 on the screen 12 in any one of a multitude of angular positions, or off-board the housing on the remote screen 40, or some other analogous display surface.

As explained above, the images on screens 12, 40 suffer degradation due to speckle noise primarily because the laser 25 has coherent waves which scatter as the laser beam is reflected from and/or passes through the screens 12, 40, and these scattered waves combine to form a stationary interference pattern. As also described above, the coherence time of the laser 25 is generally in the nanosecond range, while the transit time of the scattered waves is on the order of picoseconds.

Figure 11:
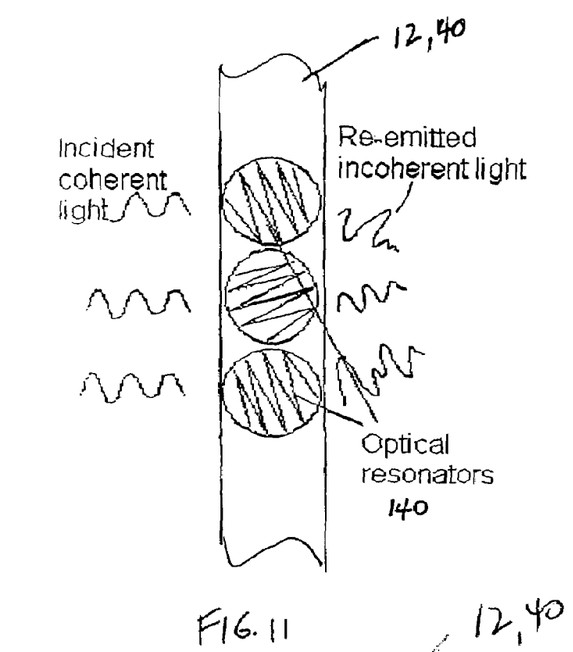
FIG. 11 is a diagrammatic view of a display screen modified in accordance with this invention.

In accordance with this invention, the display screen 12, 40 is modified, as schematically shown in FIG. 11, to include, for example, a plurality of optical resonators 140, preferably small particles of photonic crystals embedded in the screen. Each optical resonator traps the incident beam for a time comparable to, and preferably exceeding, the coherence time, thereby holding the beam at the screen not for picoseconds, but for nanoseconds. The waves of the laser beam are scattered by the resonators and generate a time-varying interference pattern which is averaged by the human eye, thereby reducing speckle noise.

Each photonic crystal particle is smaller in size than a pixel. Each particle is a periodic dielectric structure, for example, silicon, that has a band gap that prevents propagation of a predetermined frequency range of light. Since the light is trapped, a resonant cavity is created.

The resonant frequency of the resonant cavity depends on the frequency of the laser beam. A red, blue or green beam will have three different frequencies, such that three different crystals of different resonant frequencies will have to be used when the image projected on the screen is in color.

The display screen is preferably constituted of a moldable material, such as plastic or rubber, and the photonic crystals are mixed in with the moldable material in a liquid state. Once the moldable material is set, the crystals are randomly distributed throughout the screen. Each resonant cavity formed by the crystals has a very high Q factor (above 10,000). The time constant, with which these cavities trap the light, is roughly equal to the round-trip time of the light inside the crystal multiplied by the Q factor and equals or exceeds the coherence time of the laser.

The display screen may be reflective for a front projection system, or may be transmissive for a rear projection system. The crystal particles need not be embedded, but can also be applied as a coating layer on a major surface of the screen.

Figure 12:
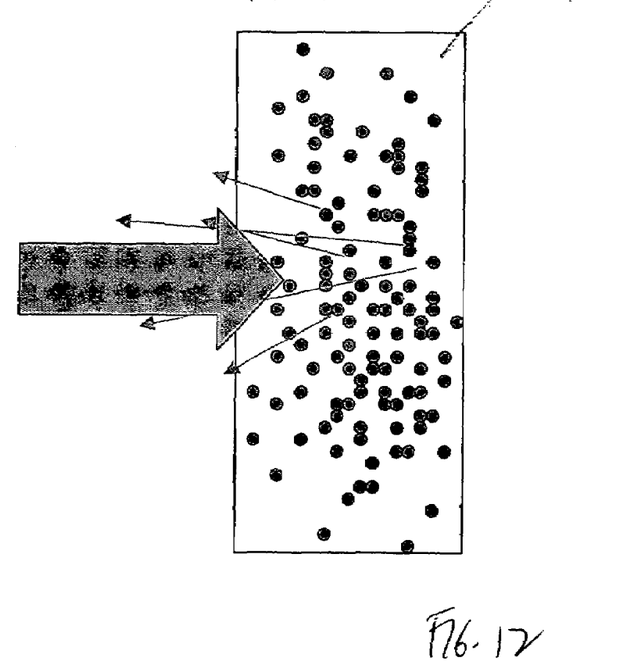
FIG. 12 is a diagrammatic view of another modified screen.

Another feature of this invention is to add an additive to the screen, again to trap the incident beam for a time preferably exceeding the coherence time. The material of the screen itself may be selected to have this trapping characteristic. If the path length of photons is longer than the coherence length of the laser, there is no interference between photons reflected from front and rear surfaces of the screen. The screen may include a flowable material, such as a fluid or a gas, whose atoms or molecules are moving by Brownian motion (see FIG. 12), or moved by heating (see the arrow in FIG. 12) the flowable material, to change the interference pattern to be time varying, the flowable material moving at a rate faster than the integration time of the human eye.

In still another approach, the screen is not modified, but instead, the bandwidth of the laser is increased. This serves to decrease the coherence time, and again the speckle noise is reduced.

It will be understood that each of the elements described above, or two or more together, also may find a useful application in other types of constructions differing from the types described above.

While the invention has been illustrated and described as embodied in an image projection arrangement for, and method of, projecting images with reduced speckle noise, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for projecting an image with reduced speckle noise, comprising:
   a) a display screen;
   b) a laser for emitting a laser beam having coherent waves of the same frequency, and a coherence time in a nanosecond range;
   c) an image projection assembly for directing the beam to be incident on the screen, and for sweeping the beam as a pattern of scan lines across the screen, each scan line having a number of pixels, and for causing selected pixels to be illuminated, and rendered visible, to produce the image on the screen; and
   d) means for modifying the screen, for trapping the beam incident on the screen for a time not less than the coherence time in the nanosecond range, and for generating a time-varying interference pattern in which the speckle noise is reduced.

2. The arrangement of claim 1, wherein the screen is constituted of one of a plastic and a rubber material.

3. The arrangement of claim 1, wherein the laser is one of a red, blue and green laser.

4. arrangement of claim 1, wherein the modifying means includes a plurality of optical resonators which trap the beam incident on the screen for a time exceeding the coherence time.

5. The arrangement of claim 4, wherein the resonators are photonic crystal particles embedded in the screen.

6. The arrangement of claim 5, wherein each particle is dimensioned to be smaller than a pixel.

7. The arrangement of claim 1; and a housing having a window through which the laser beam is swept, and wherein the screen is mounted on the housing.

8. A method of projecting an image with reduced speckle noise, comprising the steps of:
   a) emitting a laser beam having coherent waves of the same frequency, and a coherence time in a nanosecond range;
   b) directing the beam to be incident on a display screen, and sweeping the beam as a pattern of scan lines across the screen, each scan line having a number of pixels, and causing selected pixels to be illuminated, and rendered visible, to produce the image on the screen; and
   c) modifying the screen and trapping the beam incident on the screen for a time not less than the coherence time in the nanosecond range, to generate a time-varying interference pattern in which the speckle noise is reduced.

9. The method of claim 8, and constituting the screen of one of a plastic and a rubber material.

10. The method of claim 8, wherein the emitting step is performed by one of a red, blue and green laser.

11. The method of claim 8, wherein the trapping step traps the beam incident on the screen for a time exceeding the coherence time.

12. The method of claim 8, wherein the supporting step is performed by embedding photonic crystal particles in the screen.

13. The method of claim 12, and dimensioning each particle to be smaller than a pixel.

14. A display screen for reducing speckle noise in an image projected on the screen, comprising: means for modifying the screen, for trapping a laser beam incident on the screen for a time not less than a coherence time in a nanosecond range of the beam, and for generating a time-varying interference pattern in which the speckle noise is reduced.

15. The display screen of claim 14, wherein the screen is constituted of one of a plastic and a rubber material.

16. The display screen of claim 14, wherein the modifying means includes a plurality of optical resonators which trap the beam incident on the screen for a time exceeding the coherence time.

17. The display screen of claim 16, wherein the resonators are photonic crystal particles embedded in the screen.

18. The display screen of claim 17, wherein each particle is dimensioned to be smaller than each pixel of the image.

19. An arrangement for projecting an image with reduced speckle noise, comprising:
   a) a display screen;
   b) a laser for emitting a laser beam having coherent waves of the same frequency, a bandwidth, and a coherence time in a nanosecond range;
   c) an image projection assembly for directing the beam to be incident on the screen, and for sweeping the beam as a pattern of scan lines across the screen, each scan line having a number of pixels, and for causing selected pixels to be illuminated, and rendered visible, to produce the image on the screen; and
   d) means for increasing the bandwidth to decrease the coherence time in the nanosecond range, thereby reducing the speckle noise.

20. An arrangement for projecting an image with reduced speckle noise, comprising:
   a) a display screen having particles;
   b) a laser for emitting a laser beam having coherent waves of the same frequency and a coherence time in a nanosecond range;
   c) an image projection assembly for directing the beam to be incident on the screen, and for sweeping the beam as a pattern of scan lines across the screen, each scan line having a number of pixels, and for causing selected pixels to be illuminated, and rendered visible, to produce the image on the screen; and
   d) means for changing a phase delay of the beam incident on the screen by movement of the particles to decrease the coherence time in the nanosecond range, and for generating a time-varying interference pattern in which the speckle noise is reduced.

* * * * *